United States Patent
Miller

(10) Patent No.: US 11,537,499 B2
(45) Date of Patent: *Dec. 27, 2022

(54) SELF EXECUTING AND SELF DISPOSING SIGNAL

(71) Applicant: Salesforce.com, Inc., San Francisco, CA (US)

(72) Inventor: Anthony Miller, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 17/232,998

(22) Filed: Apr. 16, 2021

(65) Prior Publication Data

US 2021/0232482 A1    Jul. 29, 2021

Related U.S. Application Data

(63) Continuation of application No. 16/696,928, filed on Nov. 26, 2019, now Pat. No. 11,016,873.

(51) Int. Cl.
  *G06F 11/34*     (2006.01)
  *G06F 8/30*      (2018.01)
  *G06F 11/36*     (2006.01)

(52) U.S. Cl.
  CPC .......... *G06F 11/3476* (2013.01); *G06F 8/31* (2013.01); *G06F 11/3612* (2013.01); *G06F 11/3644* (2013.01)

(58) Field of Classification Search
  None
  See application file for complete search history.

(56) References Cited

U.S. PATENT DOCUMENTS

| | | |
|---|---|---|
| 11,016,873 B1 | 5/2021 | Miller |
| 2018/0107491 A1 | 4/2018 | Wang et al. |
| 2018/0198872 A1 | 7/2018 | Wang et al. |
| 2018/0199386 A1 | 7/2018 | Yuan et al. |
| 2021/0157709 A1 | 5/2021 | Miller |

OTHER PUBLICATIONS

U.S. Appl. No. 16/696,928, Examiner Interview Summary dated Jan. 29, 2021, 1 pg.
U.S. Appl. No. 16/696,928, Notice of Allowance dated Jan. 29, 2021, 15 pgs.
Class MulticastProcessor (RxJava Javadoc 2.2.15), 9 pgs.; Accessed on Nov. 25, 2019 at http://reactivex.io/RxJava/javadoc/io/reactivex/processors/MulticastProcessor.html.
Krenecky, Robin, "Mobile application development using the ReactiveX framework," Spring 2018, Masaryk University, p. 1-65. (Year: 2018).
Peelen, Dorus, "Working With Unreliable Observers Using Reactive Extensions," Nov. 10, 2016, RadboudUniversity, p. 1-46. (Year: 2016).

*Primary Examiner* — Qing Chen
(74) *Attorney, Agent, or Firm* — Polygon IP, LLP

(57) ABSTRACT

Described herein are systems, apparatus, methods and computer program products for implementing a self executing and self disposing signal for an imperative programming language. The self executing and self disposing signal may be utilized by a ReactiveX specification programming language. The signal may be executed before it is observed by an external observer, reducing load times. Additionally, the signal may allow for multiple observers to observe the output of the signal at the same time and may be self disposing to prevent memory leaks.

20 Claims, 7 Drawing Sheets

SELF EXECUTING AND SELF DISPOSING SIGNAL

CROSS-REFERENCE TO RELATED APPLICATIONS

This application is a continuation of, and claims priority to, and commonly assigned U.S. patent application Ser. No. 16/696,928 (now U.S. Pat. No. 11,016,873) by Anthony Miller, titled Self Executing and Self Disposing Signal, filed on Nov. 26, 2019, which is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever

FIELD OF TECHNOLOGY

This patent document relates generally to data processing and more specifically to signal processing for imperative programming languages utilizing the ReactiveX specification.

BACKGROUND

Imperative programming languages that follow the ReactiveX specification utilize signals that operate on data in a flow based manner instead of a state based manner. Thus, in such languages, an observer dispatches (e.g., initiates) a signal and observes the state of the signal, and the changes thereof, during execution of the signal.

BRIEF DESCRIPTION OF THE DRAWINGS

The included drawings are for illustrative purposes and serve only to provide examples of possible structures and operations for the disclosed inventive systems, apparatus, methods and computer program products for a self executing and self disposing signal used in imperative programming. These drawings in no way limit any changes in form and detail that may be made by one skilled in the art without departing from the spirit and scope of the disclosed implementations.

DETAILED DESCRIPTION

Figure 1:
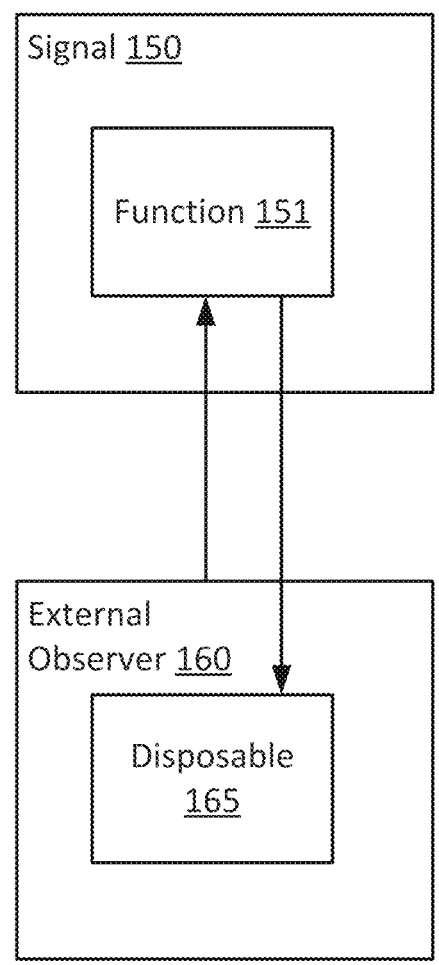
FIG. 1 illustrates an example configuration of a signal function in an imperative programming language, configured in accordance with one or more embodiments.

Some implementations of the disclosed systems, apparatus, methods and computer program products are configured for implementing a self-executing and self-disposing signal for an imperative programming language. The signal may be utilized by a ReactiveX specification programming language to allow for a signal that is dispatched (e.g., initiated or started) before it is observed by an external observer, reducing load times. Additionally, the signal allows for multiple observers to observe the signal at the same time. The signal is also self disposing to prevent memory leaks.

In typical ReactiveX specification languages, a signal is only dispatched when the signal is observed by an observer. Typically, the observer is an external observer (e.g., an observer associated with another process) that observes the flow of data of the signal to utilize the output of the signal for another process. Thus, once the external observer begins observing the signal and, thus, dispatches the signal, the external observer then observes the flow (e.g., result of processing) of the signal. In such configurations, a signal is only dispatched when an external observer observes the signal and, thus, cannot be pre-executed (e.g., to increase execution speed). Furthermore, such signals are generally configured to dispatch a separate process each time a different observer observes the signal. As such, each instance of such signals can only be observed by one observer and, accordingly, observers are unable to share data flow for the same signal.

Todd is a customer of HighSavings Bank that is using HighSavings' mobile application to obtain details about his account. The mobile application is programmed on the ReactiveX specification. Todd, in a series of actions right before his monthly review meeting, commands the application to load his account data, load a trading platform to execute trades, and, finally, extrapolate his monthly savings based on the amount he has spent in the month to date. Unfortunately for Todd, HighSavings Bank's application is programmed without self-executing signals and, thus, the actions for each of his commands begin executing only after an observer is dispatched to observe the state of the commands. This leads to a slower load time, resulting in Todd being unable to view the extrapolation of his monthly savings before his review meeting.

By contrast, described herein is a signal, for an imperative programming language that conforms to the ReactiveX specification, configured to be dispatched before external observers are present to observe the signal. By way of example, using the techniques discussed herein, processing of the signal may include creating the signal, creating an internal observer, and dispatching the signal due to the presence of the internal observer. One or a plurality of external observers (e.g., a conventional observer that observes the outputs of the signal function) may observe the internal observer to obtain the outputs of the signal function. The signal may be disposed upon a determination that the internal observer is not being observed by any external observers and a determination that the signal is not being referenced by the first instruction.

The next month, HighSavings Bank has upgraded their mobile application to allow their platform to utilize the signals described herein. Todd once again finds himself using the HighSavings Bank mobile application before his monthly review meeting. Again, Todd commands the application to load his account data, then load a trading platform to execute trades, and, finally, extrapolate his monthly savings based on the amount he has spent in the month to date. As HighSavings Bank's application has been updated, the account data, trading platform, and extrapolation are now all pre-fetched. Thus, this month, the loading times of HighSavings Bank's mobile application is much reduced and Todd is able to view all of his requests before his review meeting.

FIG. 1 illustrates an example configuration of a signal function in an imperative programming language, configured in accordance with one or more embodiments. FIG. 1 illustrates signal 150. As shown in FIG. 1, signal 150 includes signal function 151. Signal function 151 may be a function that processes data and provides an output (e.g., a data flow to external observer 160). When signal function 151 is directly observed by external observer 160, memory is allocated to signal function 151.

In imperative programming languages conforming to the ReactiveX specification, signal function 151 only dispatches upon being observed by an observer. In the embodiment shown in FIG. 1, external observer 160 dispatches signal function 151 when external observer 160 observes signal function 151. In such an embodiment, signal function 151 may thus be declared without being dispatched and remain essentially idle before external observer 160 observes and, thus, initiates signal function 151. Furthermore, only one observer may directly observe signal function 151 and, upon the external observer ceasing to observe signal function 151, signal function 151 is disposed. Thus, signal function 151 can effectively interface with only one external observer in the configuration of FIG. 1.

External observer 160 is associated with another function different from that of signal function 151. When observing signal function 151, external observer 160 obtains outputs from operation of signal function 151 and provides it to the other function. Additionally, signal function 151 provides a "disposable" which external observer 160 retains as disposable 165. Disposable 165 allows for external observer 160 to dispose of (e.g. cancel) the observation when the desired output from signal function 151 has been obtained and/or when otherwise desired to dispose of signal function 151. Disposable 165 is disposed by external observer 160 when external observer 160 no longer requires further outputs from signal function 151 and, accordingly, causes external observer 160 to cease observing signal function 151, disposing of signal function 151. Once signal function 151 has been disposed of, memory allocated to operation of signal function 151 is de-allocated.

Figure 2:
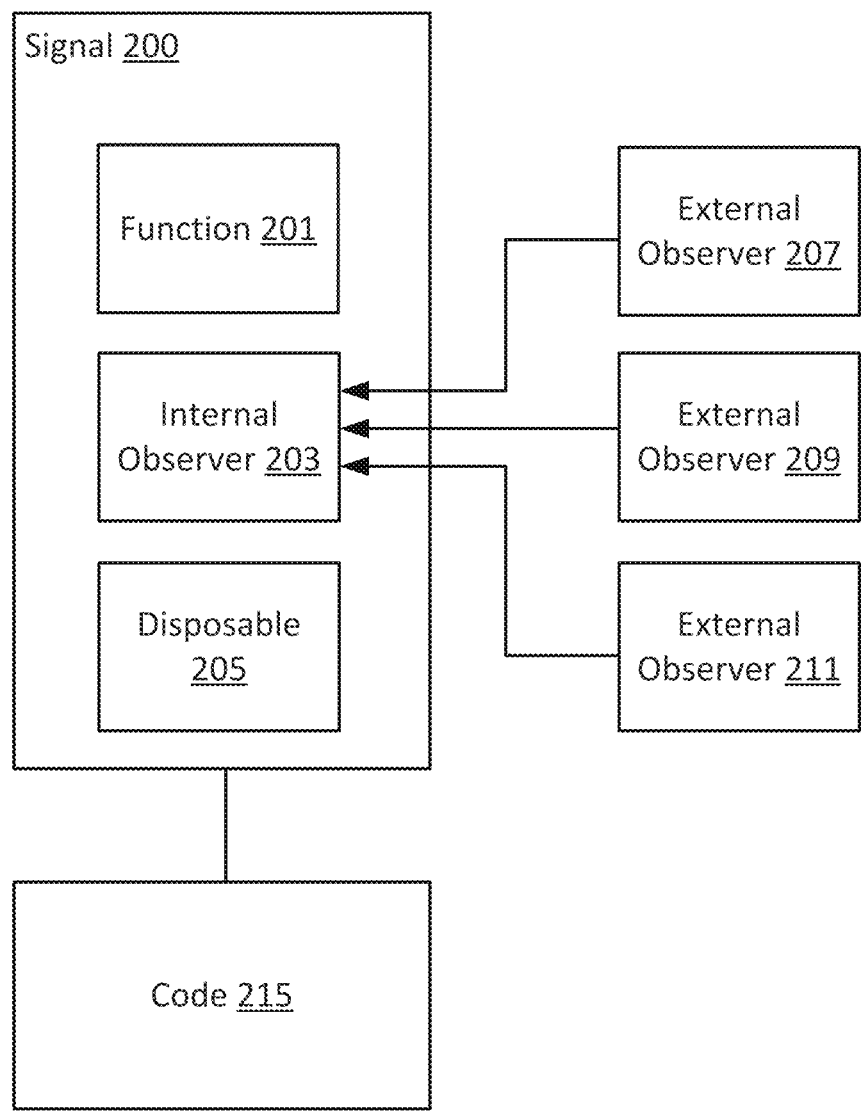
FIG. 2 illustrates another example configuration of a signal function in an imperative programming language, configured in accordance with one or more embodiments.

FIG. 2 illustrates another example configuration of a signal function in an imperative programming language, configured in accordance with one or more embodiments. FIG. 2 illustrates self-executing signal 200. Self-executing signal 200 is a self-executing and self-disposing signal that includes signal function 201, internal observer 203, and disposable 205. Signal function 201 may be a function of a program executed by a computing system (e.g., of a desktop, laptop, smartphone, tablet, or other device) through one or more processors and memories. Code 215 may be program code that provides instructions for various aspects of a computer program, such as the creation and operation of various functions, observers, and other aspects of the computer program.

Signal function 201 may be a signal function as described herein. Thus, signal function 201 may be a function that processes data and provides a flow output based on the processing. Outputs from signal function 201 may be utilized by other functions. In certain embodiments (e.g., within ReactiveX specifications) signal function 201 may be dispatched (e.g., initiated) upon being observed by an observer. In the embodiments described herein, in order to dispatch signal function 201 before any external observers are observing signal function 201, internal observer 203 is created. In certain embodiments, internal observer 203 is created at the same time as signal function 201. In such an embodiment, signal function 201 may be dispatched at the time of creation or shortly thereafter. In other embodiments, code 215 may create the internal observer during a time later than the time of creation of signal function 201. In such an embodiment, code 215 may thus control when signal function 201 will be dispatched through timing of the creation of internal observer 203.

Thus, referring back to the example of Todd and HighSavings Bank, HighSavings Bank's updated application may create a first signal and a second signal when Todd loads the portion of the application that includes the trading platform. The first signal may recall the current value of all of Todd's holdings. As such, the first signal is created with an internal observer to immediately initiate the first signal upon loading of the portion of the application. The second signal may obtain a quote of the current value of a stock that the user is interested in purchasing. In order to decrease load times, the second signal may also be created at the time of loading of the portion of the application. However, as equity values are constantly changing, the internal observer of the second signal function is not created until the user (Todd) enters a stock signal that he is interested in a quotation for.

Internal observer 203 is an observer of self-executing signal 200 and, unlike external observers 207, 209, and 211, not an observer belonging to another external function. Internal observer 203 may be configured to be observed by a plurality of external observers. In the embodiment of FIG. 2, external observers 207, 209, and 211 may all observe internal observer 203. Internal observer 203 may obtain the outputs (e.g., results) of signal function 201 when signal function 201 is run. By observing internal observer 203, each of the external observers may also obtain the output from signal function 201 (e.g., internal observer 203 provides the outputs of signal function 201 to each of external observers 207, 209, and 211). Thus, a plurality of external observers may each obtain the output of signal function 201 despite, in certain embodiments, signal function 201 being configured to only be observed by one observer.

Furthermore, the external observers are able to observe internal observer 203 at a time after the creation of internal observer 203, allowing for signal function 201 to be dispatched before being observed by any external observers. Additionally, the external observers are free to observe and disengage from internal observer 203 without the disengagement of the external observer leading to the disposing of signal function 201. As such, signal function 201 will continue to execute regardless of whether any external observers are observing internal observer 203.

Continued operation of self-executing signal 200 by the electronic device consumes resources and/or memory of the electronic device. Thus, self-executing signal 200 includes disposable 205. Disposable 205 is a portion of self-executing signal 200 and determines when it is appropriate to dispose of self-executing signal 200. When disposable 205 is disposed, signal function 201 is disposed (e.g., canceled). Disposable 205 may reference internal observer 203 and/or code 215 to determine whether to dispose of self-executing signal 200.

Disposable 205 may determine if code 215 references self-executing signal 200. If code 215 references self-executing signal 200 a determination may be made that self-executing function 200 and/or signal function 201 is still needed and, as such, should not be disposed. If disposable 205 determines that no external observers are observing internal observer 203 and code 215 is not referencing self-executing signal 200, then disposable 205 may determine that self-executing function 200 and/or signal function 201 is no longer needed and, thus, dispose of self-executing function 200 and/or signal function 201.

Furthermore, in certain embodiments, disposable 205 may also be configured to determine whether any external observers are observing internal observer 203. If there is any external observer observing internal observer 203, disposable 205 may not dispose of self-executing signal 200 and/or signal function 201.

In certain embodiments, disposable 205 may dispose of self-executing signal 200 and/or signal function 201 upon instructions from code 215. Thus, unlike typical techniques that dispose of signals with a disposable of the external observer and lacks the ability for signals to be disposed while being observed by the external observer, the current techniques allow for code 215 to provide an explicit command to disposable 205 to dispose of self-executing signal 200 and/or signal function 201. Upon receiving the explicit command, disposable 205 may proceed to dispose of self-executing signal 200 and/or signal function 201 regardless of whether any external observers are observing internal observer 203. In certain other embodiments, upon receiving the explicit command, disposable 205 may determine if any external observers are observing internal observer 203 and, if no external observers are observing internal observer 203, dispose of self-executing signal 200 and/or signal function 201.

Figure 3:
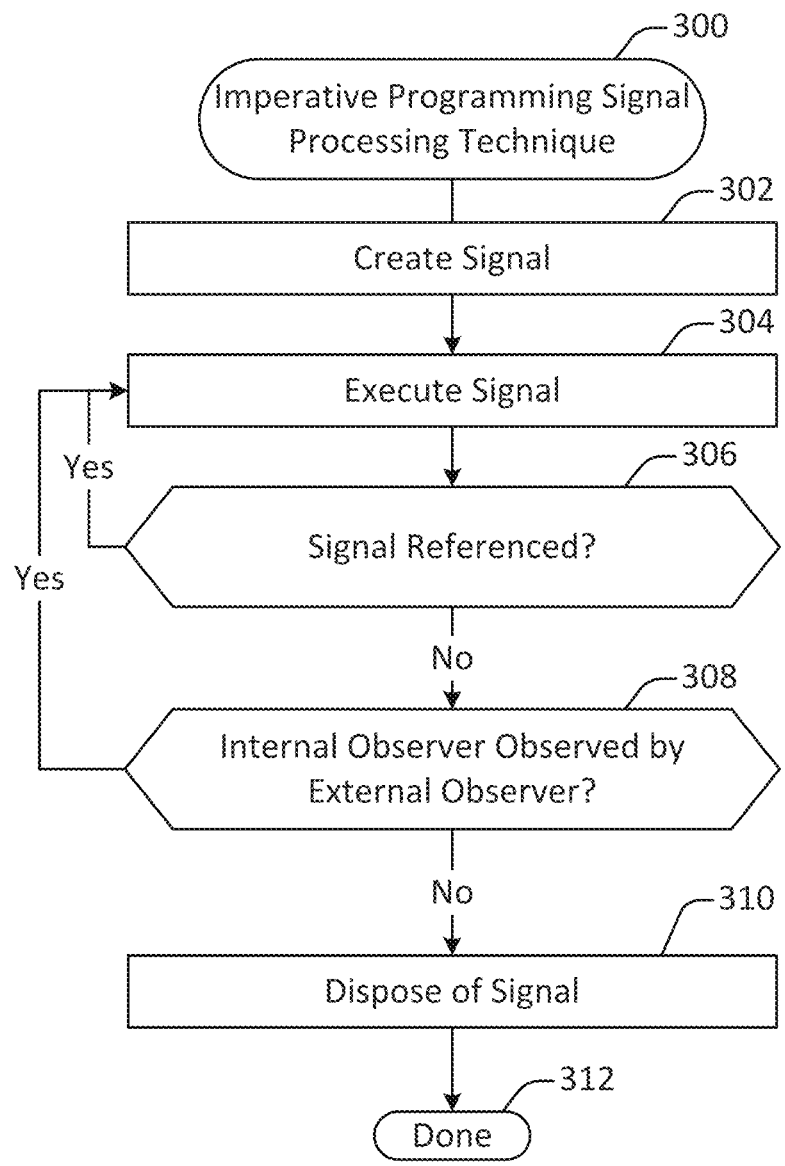
FIG. 3 illustrates an example of a method for imperative programming signal processing, performed in accordance with one or more embodiments.

FIG. 3 illustrates an example of a method for imperative programming signal processing, performed in accordance with one or more embodiments. FIG. 3 illustrates imperative programming signal processing technique 300 that creates, operates, and disposes of a self-executing signal as described herein. The self-executing signal may be a portion of a program and may be controlled by program code.

In step 302, a self-executing signal that includes a signal function is created. The self-executing signal may include a signal function as described herein (e.g., signal function 201). The self-executing signal can also include an internal observer and a disposable in certain embodiments.

In step 304, the signal function is dispatched (e.g., executed). The signal function may be configured to perform one or more operations. In various embodiments, the signal function may be dispatched upon being observed by an internal observer. In the embodiment described in FIG. 3, the internal observer is created along with the signal function (in step 302). Other embodiments, such as the embodiment described in FIG. 3, may create the internal observer at a time later than that of the time when the signal function is created, as described herein. The self-executing signal, upon determining that the signal function is observed by the internal observer, dispatches the signal function.

In various embodiments, the outputs are a data flow from execution of the signal function. The internal observer observes the execution of the signal function and obtains the outputs. As described herein, due to the presence of the internal observer, the signal function may begin executing before any external observers are observing the internal observer. Such a technique allows for pre-executing of the signal function, reducing load times. Thus, for example, a signal function may begin executing before its output is needed. In such an embodiment, external observers are not required to observe the internal observer (e.g., to dispatch the signal function) before the external observer requires the output. External observers can then observe the internal observer to obtain the output when the external observer requires the output.

During execution of the signal function, external observers may observe the internal observer to obtain, from observing the internal observer, outputs from the execution of the signal function. In various embodiments, the external observer observing the internal observer may obtain outputs from the signal function that the signal function is providing at that time. As the signal function provides data in a flow based manner, the external observer thus obtains outputs from the signal function of the flow at the times when the external observer is observing the internal observer.

In various embodiments, the internal observer may include a buffer. The buffer may be configured to store a number of the last events output from the signal function. The number may be set as needed (e.g., programmed to store the last 1-10 or more events, as needed). The buffer allows the internal observer to store and replay the number of previous events, allowing external observers to observe those events. As such, an external observer that views the internal observer may be able to replay the previous events and obtain the data regardless of whether the external observer had been observing the internal observer when the events were performed.

In step 306, the disposable determines if the self-executing signal is referenced by any other portions of the code. Thus, for example, the disposable may determine if the self-executing signal is being referenced by code currently being executed by the program and/or code that the program may execute (e.g., by utilizing reference counting behavior or through another technique). If the self-executing signal is referenced by any part of those portions of the code, the disposable may determine that the self-executing signal should still be executed and, thus, the technique returns to step 304 and continues executing the signal function. If the disposable determines that no portions of the code (either being executed or remaining) references the self-executing signal, the technique may proceed to step 308. In various embodiments, step 306 may be periodically performed (e.g., at regular time intervals), performed according to milestones (e.g., when execution of the signal function has accomplished various tasks or has finished executing), or according to other conditions.

In step 308, after determining that the self-executing signal is not being referenced by any other portions of code, the self-executing function may determine if the function should be disposed of. Disposing of the signal conserves processing and memory resources and prevents memory leaks. In step 308, the disposable determines if any external observers are observing the internal observer. If the disposable determines that the internal observer is being observed by one or more external observers, the technique returns to step 304 and continues executing the signal function. If the disposable determines that the internal observer is not being observed by any external observers, the technique may proceed to step 310.

In step 310, the disposable may dispose of the signal function and/or the self-executing signal, as described herein. Thus, the disposable may cease executing the signal function and/or the self-executing signal and free up system resources. The technique is then finished in step 312.

Returning to the example of HighSavings Bank, upon entering his meeting, Todd leaves HighSavings Bank's application open on his phone. Todd had previously queried a stock quote for AlwaysUp and had purchased 200 shares of AlwaysUp based on the quote. Todd had also requested that the application extrapolate his monthly savings based on his current spending.

HighSavings' application, upon determining that the stock quote has been provided, checks to see if it should dispose of the quoting signal. The quoting function utilizes a pre-executing quotation signal, as described herein, to more quickly obtain the quote. An external observer associated with the stock purchasing function of the application observes the internal observer of the pre-executing quotation signal, to obtain up to date quotes. The pre-executing quotation signal, after Todd has purchased his stock, determines that no external observer is observing the internal observer of the pre-executing quotation signal. It also determines that no other portions of the code references the pre-executing quotation signal as no other portion of the code requires a stock quote for AlwaysUp. The disposable then determines that the pre-executing quotation signal can be disposed of and accordingly disposes of the pre-executing quotation signal.

HighSavings' application also uses a pre-executing forecasting signal for extrapolating the monthly savings. The application also checks to see if the extrapolation signal should be disposed. A disposable of the pre-executing forecasting signal then determines that no current external observers are observing the internal observer of the pre-executing forecasting signal. However, the disposable determines that the extrapolation auto updates based on new data and that the pre-executing forecasting signal is referenced by code for the auto updates. Thus, the application determines that the pre-executing forecasting signal should not be disposed.

Figure 4:
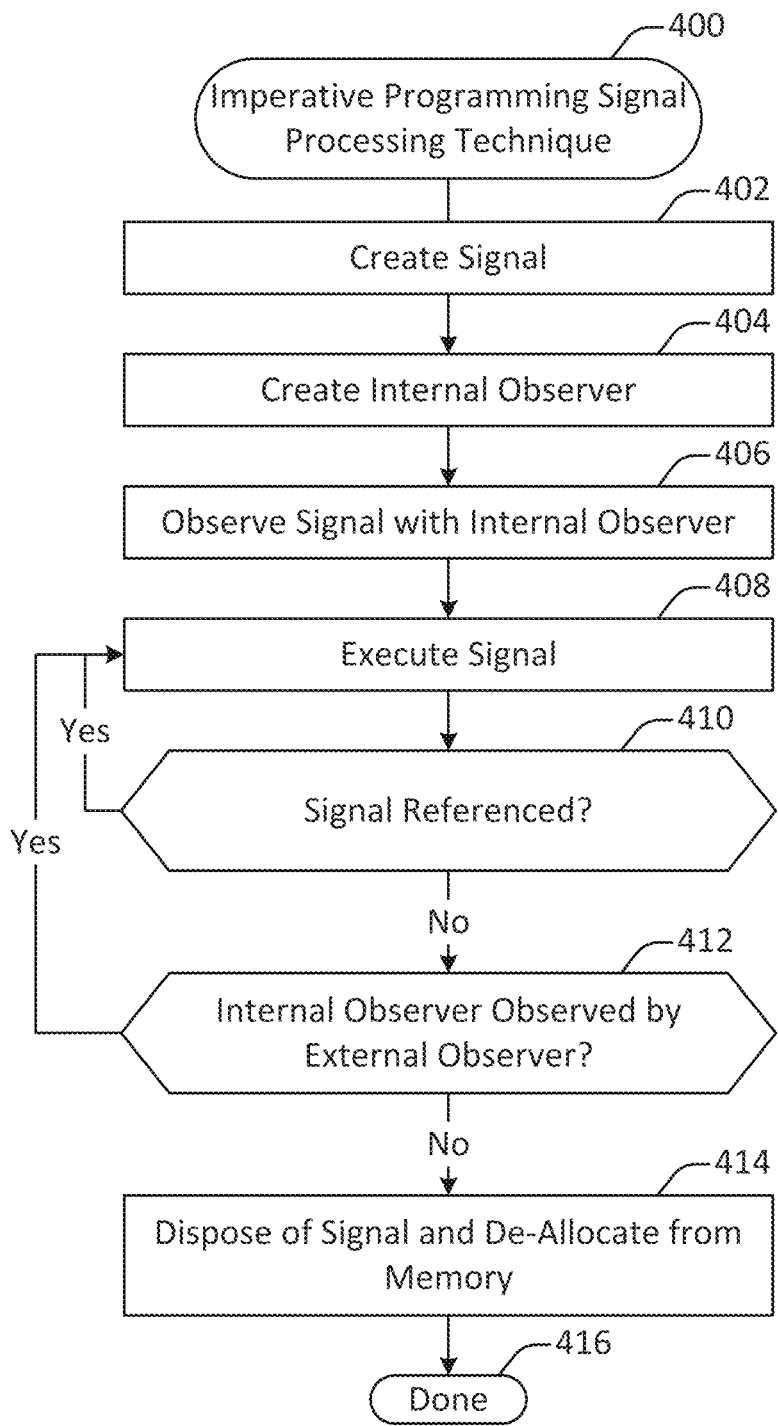
FIG. 4 illustrates another example of a method for imperative programming signal processing, performed in accordance with one or more embodiments.

FIG. 4 illustrates another example of a method for imperative programming signal processing, performed in accordance with one or more embodiments. FIG. 4 describes a technique of creating and processing a self-executing signal that includes a signal function. The technique described in FIG. 4 includes similar steps to that of FIG. 3. For example, steps 402, 408, 410, and 412 are similar to steps 302, 304, 306, and 308 of FIG. 3, respectively. Thus, in step 402, the self-executing function is created. The self-executing signal includes a signal function and the signal function may be created at step 402 along with the self-executing signal.

In step 404, the internal observer is created. In step 404, the internal observer is created at a time later than the time that the signal function is created (in step 402). As such, the program code may dispatch the signal function at a time later than the creation of the signal, but before any external observers observe the internal observer, by controlling when the internal observer is created. After the internal observer has been created, the internal observer then observes the signal function in step 406. Accordingly, in step 408, the self-executing signal, upon determining that the signal function is observed by the internal observer, executes the signal function.

Upon or during execution of the signal function, the self-executing signal determines if the signal function and/or the self-executing function should be disposed, through steps 410 and 412. Steps 410 and 412 are similar to steps 306 and 308 of FIG. 3, respectively. The determination of whether to dispose of the signal function and/or self-executing function, made in steps 410 and 412, and thus be similar to the determination technique described for steps 306 and 308.

If the disposable determines that the signal function and/or the self-executing function should be disposed, the disposable may dispose of the signal function and/or the self-executing function in step 414. Thus, the disposable may cease executing the signal function and/or the self-executing function and memory allocated to the self-execrating signal may be de-allocated and freed to be used by other processes. The technique is then finished in step 416.

Figure 5:
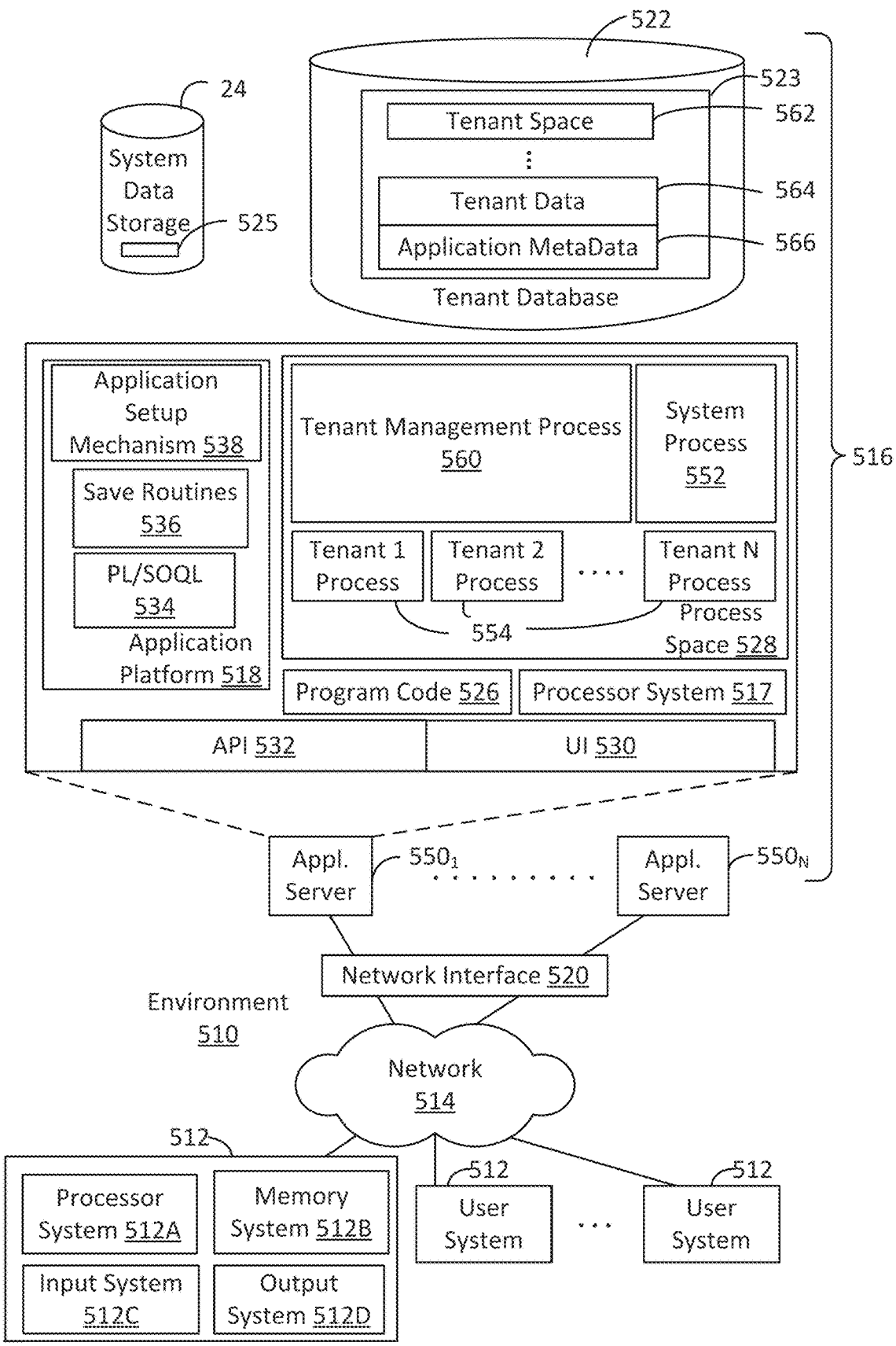
FIG. 5 illustrates an example of a computing system, configured in accordance with one or more embodiments.

FIG. 5 illustrates an example of a computing system, configured in accordance with one or more embodiments. FIG. 5 shows a block diagram of an example of an environment 510 that includes an on-demand database service configured in accordance with some implementations. Environment 510 may include user systems 512, network 514, database system 516, processor system 517, application platform 518, network interface 520, tenant data storage 522, tenant data 523, system data storage 524, system data 525, program code 526, process space 528, User Interface (UI) 530, Application Program Interface (API) 532, PL/SOQL 534, save routines 536, application setup mechanism 538, application servers 550-1 through 550-N, system process space 552, tenant process spaces 554, tenant management process space 560, tenant storage space 562, user storage 564, and application metadata 566. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 516, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 516. Such applications may be developed by the database service provider or by users or third-party application developers accessing the service. Application platform 518 includes an application setup mechanism 538 that supports application developers' creation and management of applications, which may be saved as metadata into tenant data storage 522 by save routines 536 for execution by subscribers as one or more tenant process spaces 554 managed by tenant management process 560 for example. Invocations to such applications may be coded using PL/SOQL 534 that provides a programming language style interface extension to API 532. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 566 for a subscriber making such an invocation. Such system processes may also manage execution of application metadata 566 as an application in a virtual machine.

In some implementations, each application server 550 may handle requests for any user associated with any organization. A load balancing function (e.g., an F5 Big-IP load balancer) may distribute requests to the application servers 550 based on an algorithm such as least-connections, round robin, observed response time, etc. Each application server 550 may be configured to communicate with tenant data storage 522 and the tenant data 523 therein, and system data storage 524 and the system data 525 therein to serve requests of user systems 512. The tenant data 523 may be divided into individual tenant storage spaces 562, which can be either a physical arrangement and/or a logical arrangement of data. Within each tenant storage space 562, user storage 564 and application metadata 566 may be similarly allocated for each user. For example, a copy of a user's most recently used (MRU) items might be stored to user storage 564. Similarly, a copy of MRU items for an entire tenant organization may be stored to tenant storage space 562. A UI 530 provides a user interface and an API 532 provides an application programming interface to system 516 resident processes to users and/or developers at user systems 512.

System 516 may implement a web-based system that utilizes imperative programming with self-executing signals. For example, in some implementations, system 516 may include application servers configured to implement and execute software applications based on imperative programming formats such as ReactiveX that contains self-executing functions. The application servers may be configured to provide related data, code, forms, web pages and other information to and from user systems 512. Additionally, the application servers may be configured to store information to, and retrieve information from a database system. Such information may include related data, objects, and/or Webpage content. With a multi-tenant system, data for multiple tenants may be stored in the same physical database object in tenant data storage 522, however, tenant data may be arranged in the storage medium(s) of tenant data storage 522 so that data of one tenant is kept logically separate from that of other tenants. In such a scheme, one tenant may not access another tenant's data, unless such data is expressly shared.

Several elements in the system shown in FIG. 5 include conventional, well-known elements that are explained only briefly here. For example, user system 512 may include processor system 512A, memory system 512B, input system 512C, and output system 512D. A user system 512 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 512 to access, process and view information, pages and applications available from system 516 over network 514. Network 514 may be any network or combination of networks of devices that communicate with one another, such as any one or any combination of a LAN (local area network), WAN (wide area network), wireless network, or other appropriate configuration.

The users of user systems 512 may differ in their respective capacities, and the capacity of a particular user system 512 to access information may be determined at least in part by "permissions" of the particular user system 512. As discussed herein, permissions generally govern access to computing resources such as data objects, components, and other entities of a computing system. "Permission sets" generally refer to groups of permissions that may be assigned to users of such a computing environment. For instance, the assignments of users and permission sets may be stored in one or more databases of System 516. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 516 may provide on-demand database service to user systems 512 using an MTS arrangement. By way of example, one tenant organization may be a company that employs a sales force where each salesperson uses system 516 to manage their sales process. Thus, a user in such an organization may maintain contact data, leads data, customer follow-up data, performance data, goals and progress data, etc., all applicable to that user's personal sales process (e.g., in tenant data storage 522). In this arrangement, a user may manage his or her sales efforts and cycles from a variety of devices, since relevant data and applications to interact with (e.g., access, view, modify, report, transmit, calculate, etc.) such data may be maintained and accessed by any user system 512 having network access.

When implemented in an MTS arrangement, system 516 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 516 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 516 may also maintain system-level data usable by multiple tenants or other data. Such system-level data may include industry reports, news, postings, and the like that are sharable between tenant organizations.

In some implementations, user systems 512 may be client systems communicating with application servers 550 to request and update system-level and tenant-level data from system 516. By way of example, user systems 512 may send one or more queries requesting data of a database maintained in tenant data storage 522 and/or system data storage 524. An application server 550 of system 516 may automatically generate one or more SQL statements (e.g., one or more SQL queries) that are designed to access the requested data. System data storage 524 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fad stored in one large table or that their data may be stored in the same table as the data of other customers.

Figure 6A:
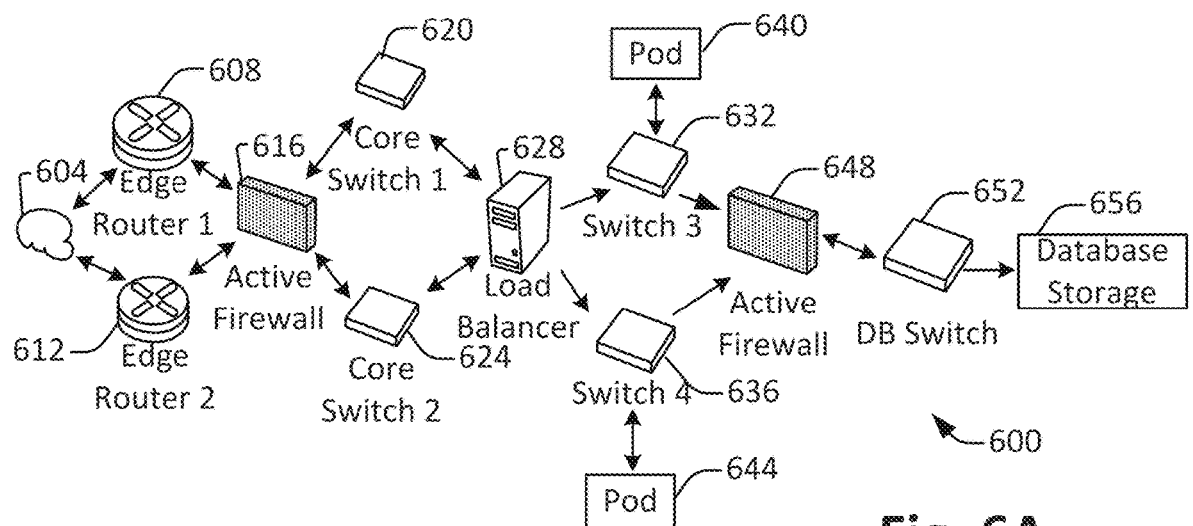
FIGS. 6A and 6B illustrate other examples of computing systems, configured in accordance with one or more embodiments.
Figure 6B:
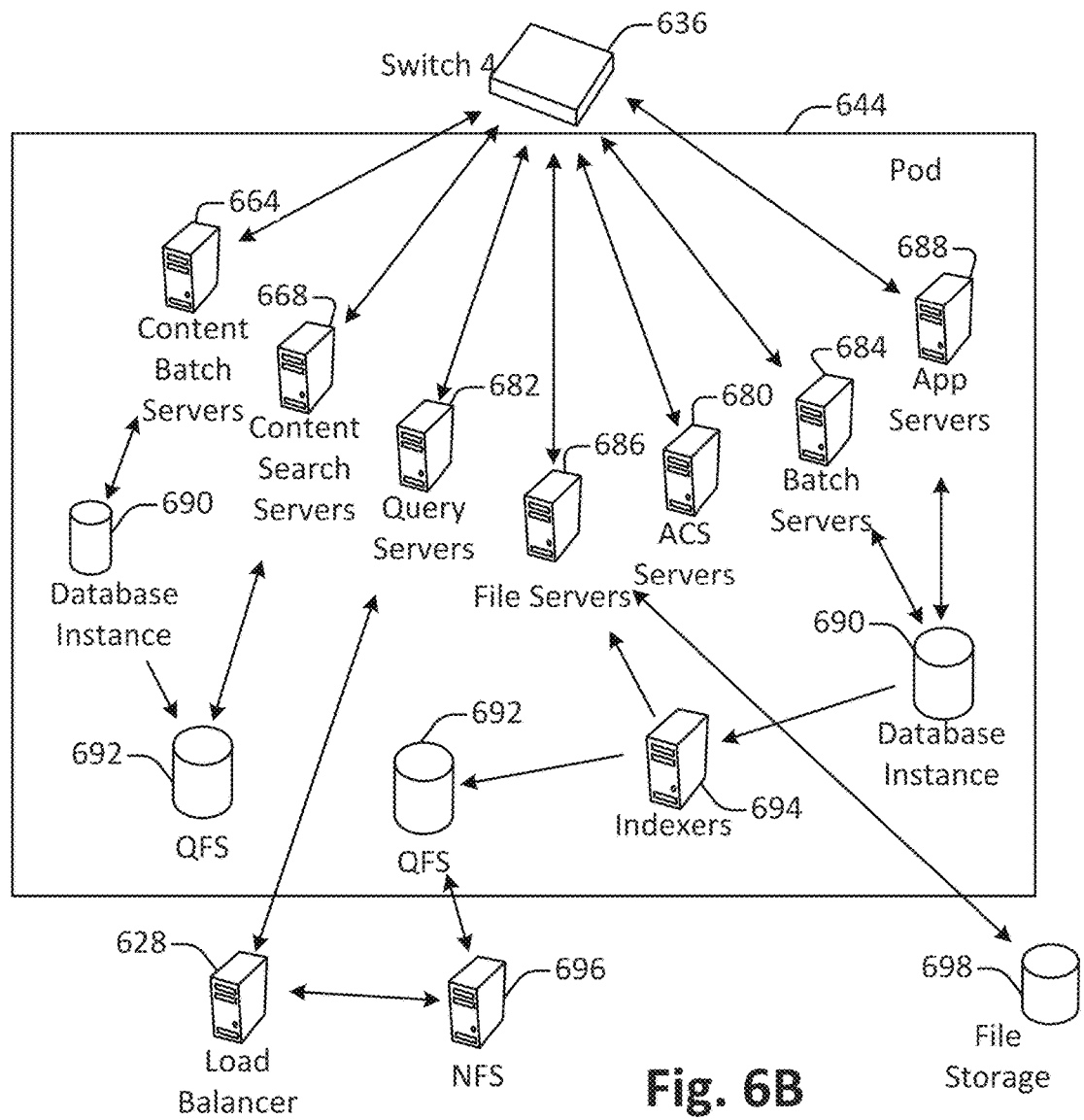

FIGS. 6A and 6B illustrate other examples of computing systems, configured in accordance with one or more embodiments. FIG. 6A shows a system diagram of an example of architectural components of an on-demand database service environment 600, configured in accordance with some implementations. A client machine located in the cloud 604 may communicate with the on-demand database service environment via one or more edge routers 608 and 612. A client machine may include any of the examples of user systems 512 described above. The edge routers 608 and 612 may communicate with one or more core switches 620 and 624 via firewall 616. The core switches may communicate with a load balancer 628, which may distribute server load over different pods, such as the pods 640 and 644 by communication via pod switches 632 and 636. The pods 640 and 644, which may each include one or more servers and/or other computing resources, may perform data processing and other operations used to provide on-demand services. Components of the environment may communicate with a database storage 656 via a database firewall 648 and a database switch 652.

Accessing an on-demand database service environment may involve communications transmitted among a variety of different components. The environment 600 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 6A and 6B.

The cloud 604 refers to any suitable data network or combination of data networks, which may include the Internet. Client machines located in the cloud 604 may communicate with the on-demand database service environment 600 to access services provided by the on-demand database service environment 600. By way of example, client machines may access the on-demand database service environment 600 to retrieve, store, edit, and/or process information.

In some implementations, the edge routers 608 and 612 route packets between the cloud 604 and other components of the on-demand database service environment 600. The edge routers 608 and 612 may employ the Border Gateway Protocol (BGP). The edge routers 608 and 612 may maintain a table of IP networks or 'prefixes', which designate network reachability among autonomous systems on the internet.

In one or more implementations, the firewall 616 may protect the inner components of the environment 600 from internet traffic. The firewall 616 may block, permit, or deny access to the inner components of the on-demand database service environment 600 based upon a set of rules and/or other criteria. The firewall 616 may act as one or more of a packet filter, an application gateway, a stateful filter, a proxy server, or any other type of firewall.

In some implementations, the core switches 620 and 624 may be high-capacity switches that transfer packets within the environment 600. The core switches 620 and 624 may be configured as network bridges that quickly route data between different components within the on-demand database service environment. The use of two or more core switches 620 and 624 may provide redundancy and/or reduced latency.

In some implementations, communication between the pods 640 and 644 may be conducted via the pod switches 632 and 636. The pod switches 632 and 636 may facilitate communication between the pods 640 and 644 and client machines, for example via core switches 620 and 624. Also or alternatively, the pod switches 632 and 636 may facilitate communication between the pods 640 and 644 and the database storage 656. The load balancer 628 may distribute workload between the pods, which may assist in improving the use of resources, increasing throughput, reducing response times, and/or reducing overhead. The load balancer 628 may include multilayer switches to analyze and forward traffic.

In some implementations, access to the database storage 656 may be guarded by a database firewall 648, which may act as a computer application firewall operating at the database application layer of a protocol stack. The database firewall 648 may protect the database storage 656 from application attacks such as structure query language (SQL) injection, database rootkits, and unauthorized information disclosure. The database firewall 648 may include a host using one or more forms of reverse proxy services to proxy traffic before passing it to a gateway router and/or may inspect the contents of database traffic and block certain content or database requests. The database firewall 648 may work on the SQL application level atop the TCP/IP stack, managing applications' connection to the database or SQL management interfaces as well as intercepting and enforcing packets traveling to or from a database network or application interface.

In some implementations, the database storage 656 may be an on-demand database system shared by many different organizations. The on-demand database service may employ a single-tenant approach, a multi-tenant approach, a virtualized approach, or any other type of database approach. Communication with the database storage 656 may be conducted via the database switch 652. The database storage 656 may include various software components for handling database queries. Accordingly, the database switch 652 may direct database queries transmitted by other components of the environment (e.g., the pods 640 and 644) to the correct components within the database storage 656.

FIG. 6B shows a system diagram further illustrating an example of architectural components of an on-demand database service environment, in accordance with some implementations. The pod 644 may be used to render services to user(s) of the on-demand database service environment 600. The pod 644 may include one or more content batch servers 664, content search servers 668, query servers 682, file servers 686, access control system (ACS) servers 680, batch servers 684, and app servers 688. Also, the pod 644 may include database instances 690, quick file systems (QFS) 692, and indexers 694. Some or all communication between the servers in the pod 644 may be transmitted via the switch 636.

In some implementations, the app servers 688 may include a framework dedicated to the execution of procedures (e.g., programs, routines, scripts) for supporting the construction of applications provided by the on-demand database service environment 600 via the pod 644. One or more instances of the app server 688 may be configured to execute all or a portion of the operations of the services described herein.

In some implementations, as discussed above, the pod 644 may include one or more database instances 690. A database instance 690 may be configured as an MTS in which different organizations share access to the same database, using the techniques described above. Database information may be transmitted to the indexer 694, which may provide an index of information available in the database 690 to file servers 686. The QFS 692 or other suitable filesystem may serve as a rapid-access file system for storing and accessing information available within the pod 644. The QFS 692 may support volume management capabilities, allowing many disks to be grouped together into a file system. The QFS 692 may communicate with the database instances 690, content search servers 668 and/or indexers 694 to identify, retrieve, move, and/or update data stored in the network file systems (NFS) 696 and/or other storage systems.

In some implementations, one or more query servers 682 may communicate with the NFS 696 to retrieve and/or update information stored outside of the pod 644. The NFS 696 may allow servers located in the pod 644 to access information over a network in a manner similar to how local storage is accessed. Queries from the query servers 622 may be transmitted to the NFS 596 via the load balancer 528, which may distribute resource requests over various resources available in the on-demand database service environment 600. The NFS 696 may also communicate with the QFS 692 to update the information stored on the NFS 696 and/or to provide information to the QFS 692 for use by servers located within the pod 644.

In some implementations, the content batch servers 664 may handle requests internal to the pod 644. These requests may be long-running and/or not tied to a particular customer, such as requests related to log mining, cleanup work, and maintenance tasks. The content search servers 668 may provide query and indexer functions such as functions allowing users to search through content stored in the on-demand database service environment 600. The file servers 686 may manage requests for information stored in the file storage 698, which may store information such as documents, images, basic large objects (BLOBs), etc. The query servers 682 may be used to retrieve information from one or more file systems. For example, the query system 682 may receive requests for information from the app servers 688 and then transmit information queries to the NFS 696 located outside the pod 644. The ACS servers 580 may control access to data, hardware resources, or software resources called upon to render services provided by the pod 644. The batch servers 684 may process batch jobs, which are used to run tasks at specified times. Thus, the batch servers 684 may transmit instructions to other servers, such as the app servers 688, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 7:
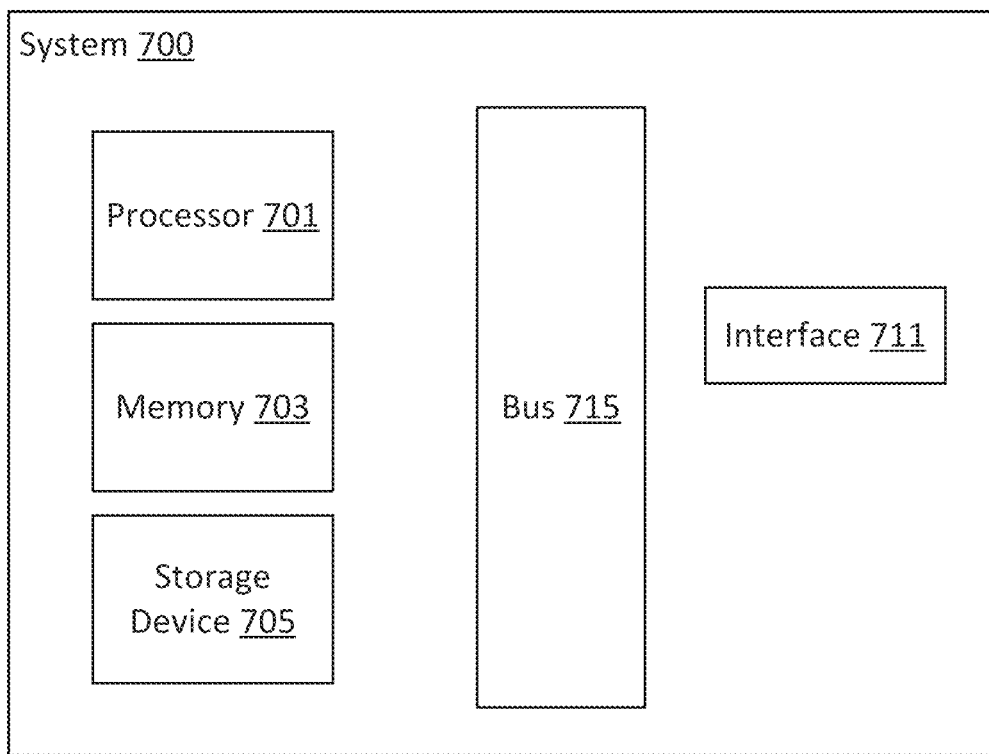
FIG. 7 illustrates an example of a computing device, configured in accordance with one or more embodiments.

FIG. 7 illustrates an example of a computing device, configured in accordance with one or more embodiments. FIG. 7 illustrates one example of a computing device.

According to various embodiments, a system 700 suitable for implementing embodiments described herein includes a processor 701, a memory module 703, a storage device 705, an interface 711, and a bus 715 (e.g., a PCI bus or other interconnection fabric.) System 700 may operate as variety of devices such as an application server, a database server, or any other device or service described herein. Although a particular configuration is described, a variety of alternative configurations are possible. The processor 701 may perform operations such as those described herein. Instructions for performing such operations may be embodied in the memory 703, on one or more non-transitory computer readable media, or on some other storage device. Various specially configured devices can also be used in place of or in addition to the processor 701. The interface 711 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method for processing a signal using imperative programming, the method comprising:
creating, based on a first indication within a first code, a signal;
determining that the signal is observed by an internal observer;
begin processing of the signal based on the determining that the signal is observed by the internal observer;
receiving, by the internal observer, an output from the processing of the signal based on the internal observer observing the signal; and
providing, by the internal observer, the output from the processing of the signal to one or more external observers of a plurality of external observers observing the internal observer.

2. The method of claim 1, further comprising:
creating the internal observer.

3. The method of claim 2, wherein the internal observer is created along with the signal, and wherein the internal observer observes the signal after the creating of the internal observer.

4. The method of claim 1, further comprising:
determining, after the beginning the processing of the signal, that the internal observer is observed by the one or more external observers of the plurality of external observers.

5. The method of claim 4, further comprising:
determining, after the beginning the processing of the signal, that the signal is not being referenced by the first code;
determining, after the determining that the internal observer is observed by the one or more external observers of the plurality of external observers, that the internal observer is not being observed by any external observers; and
disposing the signal based on the determining that the internal observer is not being observed by any external observers and the determining that the signal is not being referenced by the first code.

6. The method of claim 5, further comprising:
deallocating the signal from memory after disposing the signal.

7. The method of claim 1, wherein:
the beginning the processing of the signal is at a first time;
the observing, by the one or more external observers of the plurality of external observers, the internal observer is at a second time; and
the first time is before the second time.

8. The method of claim 1, wherein the signal is a ReactiveX specification signal.

9. A computer program product comprising computer-readable program code capable of being executed by one or more processors when retrieved from a non-transitory computer-readable medium, the computer-readable program code comprising instructions configurable to cause operations comprising:

creating, based on a first indication within a first code, a signal;

determining that the signal is observed by an internal observer;

begin processing of the signal based on the determining that the signal is observed by the internal observer;

receiving, by the internal observer, an output from the processing of the signal based on the internal observer observing the signal; and providing, by the internal observer, the output from the processing of the signal to one or more external observers of a plurality of external observers observing the internal observer.

10. The computer program product of claim 9, wherein the operations further comprise:

creating the internal observer.

11. The computer program product of claim 10, wherein the internal observer is created along with the signal, and wherein the internal observer observes the signal after the creating of the internal observer.

12. The computer program product of claim 9, wherein the operations further comprise:

determining, after the beginning the processing of the signal, that the internal observer is observed by the one or more external observers of the plurality of external observers.

13. The computer program product of claim 12, wherein the signal comprises a disposable, and wherein the operations further comprise:

determining, with the disposable, that conditions for disposing of the signal have been met, wherein the conditions for disposing of the signal comprise:

that the signal is no longer referenced by the computer-readable program code; and that the internal observer is not being observed by any external observers; and disposing the signal.

14. The computer program product of claim 13, wherein the conditions for disposing of the signal further comprise:

receiving an instruction to cease operation of the signal.

15. The computer program product of claim 9, wherein the beginning the processing of the signal is before any external observers are observing the internal observer.

16. A computing system implemented using a server system, the computer computing system comprising:

a processor;

a memory;

a signal function configured to begin processing a signal when observed by an observer and return an output based on the processing of the signal function; and an internal observer configured to observe the signal function to begin the processing of the signal function and receive the output from the processing of the signal function, wherein the internal observer is further configured to be observed by a plurality of external observers to allow the plurality of external observers to each view the output from the processing of the signal function.

17. The computing system of claim 16, further comprising:

a disposable configured to:

determine that the signal is not being referenced by program code;

determine that the internal observer is not being observed by any external observers: and cause, based on the determining that the signal is not being referenced by the program code and the determining that the internal observer is not being observed by any external observers, disposal of the signal.

18. The computing system of claim 16, further comprising:

the plurality of external observers.

19. The computing system of claim 16, wherein the internal observer comprises a buffer configured to store a pre-determined number of outputs and to allow the plurality of external observers to view the pre-determined number of outputs.

20. The computing system of claim 16, wherein the signal function is a ReactiveX specification signal function.

* * * * *